(12) United States Patent
Helmeke et al.

(10) Patent No.: US 11,466,186 B2
(45) Date of Patent: Oct. 11, 2022

(54) MOISTURE CURABLE HOT MELT SEALANT COMPOSITION

(71) Applicant: H.B. Fuller Company, St. Paul, MN (US)

(72) Inventors: Marietta B Helmeke, Little Canada, MN (US); Claudia Mosanu, Blaine, MN (US)

(73) Assignee: H.B. Fuller Company, St. Paul, MN (US)

( * ) Notice: Subject to any disclaimer, the term of this patent is extended or adjusted under 35 U.S.C. 154(b) by 399 days.

(21) Appl. No.: 16/672,072

(22) Filed: Nov. 1, 2019

(65) Prior Publication Data

US 2020/0140730 A1    May 7, 2020

Related U.S. Application Data

(60) Provisional application No. 62/754,868, filed on Nov. 2, 2018.

(51) Int. Cl.

| | | |
|---|---|---|
| *C09J 175/08* | (2006.01) | |
| *C03C 27/10* | (2006.01) | |
| *C09J 5/06* | (2006.01) | |
| *C09J 123/22* | (2006.01) | |
| *C09J 131/04* | (2006.01) | |
| *E06B 3/673* | (2006.01) | |
| *C08K 3/34* | (2006.01) | |

(52) U.S. Cl.
CPC ............ *C09J 175/08* (2013.01); *C03C 27/10* (2013.01); *C09J 5/06* (2013.01); *C09J 123/22* (2013.01); *C09J 131/04* (2013.01); *E06B 3/6733* (2013.01); *E06B 3/67321* (2013.01); *C08K 3/34* (2013.01)

(58) Field of Classification Search
CPC ...... C09J 175/08; C09J 123/22; C09J 131/04; C09J 5/06; C08K 3/34; E06B 3/6733; E06B 3/67321; C03C 27/10
USPC ........................................................ 524/590
See application file for complete search history.

(56) References Cited

U.S. PATENT DOCUMENTS

| | | | | |
|---|---|---|---|---|
| 6,803,412 | B2 * | 10/2004 | Nguyen-Misra | C09J 175/06 525/131 |
| 8,263,226 | B2 * | 9/2012 | Rosenau | C08G 18/12 428/447 |
| 8,637,605 | B1 | 1/2014 | Mosanu et al. | |
| 9,023,946 | B2 | 5/2015 | Suen et al. | |
| 2011/0042004 | A1 | 2/2011 | Schubert et al. | |
| 2013/0237676 | A1 | 9/2013 | Ferenz et al. | |
| 2016/0311963 | A1 | 10/2016 | Lobert et al. | |
| 2017/0226285 | A1 | 8/2017 | Lobert et al. | |

FOREIGN PATENT DOCUMENTS

| | | | |
|---|---|---|---|
| DE | 1462500 | * 9/2004 | |
| WO | WO 2004-085565 | 10/2004 | |
| WO | WO-2004085565 A1 * | 10/2004 | ............. C03C 27/10 |

OTHER PUBLICATIONS

BASF, Oppanol B100 Technical Information, Apr. 1999. (Year: 1999).*
Exxonmobil, ESCOREZ 1304, downloaded from MatWeb on Jan. 27, 2022. (Year: 2022).*
INEOS Oligomers Indopol Polybutene H-1900 product literature, Sep. 2008 (1 page).
OPPANOL B Types product literature, Apr. 1999, BASF Aktiengsellschaft, Ludwigshafen, Germany (14 pages).
INEOS Oligomers product literature, Indopol Polybutenes, Sep. 28, 2018 (3 pages).
DuPont Elvax 40 W product literature, Oct. 8, 2017, (3 pages) E.I. du Pont de Nemours and Company.
ATEVA product literature, Sep. 2013, Celanese EVA Polymers (7 pages).
SYLVALITE RE 110L rosin ester product literature, Aug. 22, 2017, Kraton Corp., (2 pages).

\* cited by examiner

*Primary Examiner* — Hui H Chin
(74) *Attorney, Agent, or Firm* — Kirsten Stone; Allison Johnson

(57) ABSTRACT

A moisture curable hot melt sealant composition that includes a silane-modified polyurethane polymer that is free of isocyanate groups, a first rosin-based tackifying agent, a second tackifying agent different from the first rosin-based tackifying agent, a first ethylene vinyl acetate copolymer, a butene component having a weight average molecular weight from 30,000 g/mole to 700,000 g/mole and being selected from the group consisting of polyisobutylene, polyisobutene, polybutene, and combinations thereof; and filler.

23 Claims, No Drawings

MOISTURE CURABLE HOT MELT SEALANT COMPOSITION

BACKGROUND

This application claims the benefit of U.S. Provisional Application No. 62/754,868 filed Nov. 2, 2018, which is incorporated herein.

The invention is directed moisture curable hot melt sealant compositions.

Sealant compositions used in the construction of windows and insulating glass units are often moisture curable and based on polyurethane prepolymers or silane-modified amorphous polyalphaolefins. Commercially available polyurethane-based sealant compositions tend to exhibit low levels of elongation. Some commercially available polyurethane sealants also include isocyanate monomer.

There is a need for a moisture curable sealant composition that exhibits good tensile strength after cure, exhibits relatively high elongation, and is free of isocyanate monomer.

SUMMARY

In one aspect, the invention features a moisture curable hot melt sealant composition that includes a silane polyurethane polymer that is free of isocyanate groups and derived from polyether, a first rosin-based tackifying agent (e.g., a rosin-ester tackifying agent), a second tackifying agent different from the first rosin-based tackifying agent, a first ethylene vinyl acetate copolymer, a butene component having a weight average molecular weight from 30,000 Oriole to 700,000 g/mote, the butene component being selected from the group consisting of polyisobutylene, polyisobutene, polybutene, and combinations thereof, and filler.

In one embodiment, the sealant composition further includes a second ethylene vinyl acetate copolymer different from the first ethylene vinyl acetate.

In some embodiments, the second tackifying agent is selected from the group consisting of aliphatic tackifying agent, aromatic tackifying agent, aromatic-modified aliphatic tackifying agent, cycloaliphatic tackifying agent, aromatic-modified cycloaliphatic tackifying agent, and combinations thereof. In other embodiments, the second tackifying agent includes no greater than 15 % by weight aromaticity based on the weight of the second tackifying agent. In another embodiment, the second tackifying agent exhibits a softening point of at least 100° C.

In one embodiment, the sealant composition includes no greater than 20% by weight of the silane polyurethane polymer, from 5% by weight to 30% by weight ethylene vinyl acetate, from 5% by weight to 30% by weight of the first rosin-based tackifying agent, and from 5% by weight to 20% by weight of the second tackifying agent. In some embodiments, the sealant composition includes no greater than 10% by weight of the butene component.

In other embodiments, the sealant composition includes from 10% by weight to 40% by weight of the first rosin-based tackifying agent.

In another embodiment, the sealant composition includes no greater than 10% by weight of the butene component. In another embodiment, the sealant composition additionally includes a polyisobutylene having a molecular weight of at least 10,000 g/mol.

In some embodiments, the sealant composition includes no greater than 20% by weight of the silane polyurethane polymer, from 5% by weight to 30% by weight ethylene vinyl acetate, from 10% by weight to 40% by weight of the first rosin-based tackifying agent, and optionally no greater than 10% by weight of the butene component.

In other embodiments, the sealant composition includes from 5% by weight to 20% by weight of the second tackifying agent.

In some embodiments, the first rosin ester tackifying agent comprises pentaerythritol ester of tall oil rosin.

In other embodiments, the filler includes talc.

In another embodiment, the sealant composition exhibits an elongation at break of at least 500% at 30 days.

In another embodiment, the sealant composition exhibits a shear adhesion failure temperature of at least 60° C.

In one embodiment, the sealant composition exhibits a lap shear of at least 150 psi at 30 days, or even at least 200 psi at 30 days.

In one embodiment, the sealant composition exhibits a moisture vapor transmission rate of no greater than 25 grams per square meter per day ($g/m^2/day$).

In some embodiments, the sealant composition exhibits a tensile strength at break of at least 200 psi or even at least 250 psi at 24 hours.

In other embodiments, the sealant composition exhibits a 60° C. heated dead load of at least 60 minutes when tested at 44 days. In another embodiment, the sealant composition exhibits a 60° C. heated dead load of at least 90 minutes when tested at 44 days.

In one embodiment, the sealant composition is free of phthalate plasticizer.

In another embodiment, the silane polyurethane polymer has a viscosity of from 10,000 cP to 60,000 cP at 25° C.

In other aspects, the invention features a moisture curable hot melt sealant composition that includes a silane polyurethane polymer that is free of isocyanate groups and derived from polyether, a first rosin-based tackifying agent, a second tackifying agent different from the first rosin ester tackifying agent, a first ethylene vinyl acetate copolymer, from 1% by weight to no greater than 7% by weight of a butene component selected from the group consisting of polyisobutylene, polyisobutene, polybutene, and combinations thereof, and filler.

In other aspects, the invention features an insulating glass unit that includes a first pane of glass, a second pane of glass, a spacer disposed between the first pane of glass and the second pane of glass, and a sealant composition disclosed herein in contact with the first pane of glass, the second pane of glass, and the spacer.

The invention features a moisture curable hot melt sealant composition that is free of isocyanate groups and that exhibits good tensile strength and good elongation after cure.

Other features and advantages will be apparent from the following description of the preferred embodiments and from the claims.

GLOSSARY

In reference to the invention, these terms have the meanings set forth below:

The term "butene component" means polybutene, polyisobutene, polyisobutylene, and combinations thereof.

DETAILED DESCRIPTION

The moisture curable hot melt sealant composition includes a silane-functional polyurethane polymer that is free of isocyanate groups, ethylene vinyl acetate, a first rosin-based tackifying agent, a second tackifying agent, a butene component, and filler.

The sealant composition exhibits an initial Brookfield viscosity of at least 100,000 centipoise (cP), at least 150,000 cP, no greater than 400,000 cP, no greater than 300,000 cP, or even no greater than 275,000 cP at 135° C.

The sealant composition preferably exhibits a 60° C. Heated Dead Load of at least 30 minutes (mins), at least 60 mins, at least 90 mins, at least 120 mins, or even at least 300 mins when tested at 44 days or even when tested at 30 days.

The sealant composition preferably exhibits a tensile strength at break of at least 150 psi, at least 200 psi, at least 250 psi, or even at least 300 psi at 24 hours, and a tensile strength at break of at least 200 psi, at least 300 psi, or even at least 500 psi at 30 days.

The sealant composition preferably exhibits an elongation at break of at least 400%, at least 500% at least 600%, or even at least 700% at 30 days.

The sealant composition preferably exhibits a lap shear strength of at least 100 psi, at least 130 psi, at least 150 psi, at least 175 psi, at least 200 psi, or even at least 250 psi at 24 hours, and a lap shear strength of at least 150 psi, at least 160 psi, at least 175 psi, at least 200 psi, or even at least 250 psi at 30 days.

The sealant composition preferably exhibits a shear adhesion failure temperature (SAFT) of at least 50° C., at least 60° C., or even at least 80° C. after 30 days or even after 44 days.

The sealant composition preferably exhibits a moisture vapor transmission rate (MVTR) of no greater than 25 grams per square meter per day (g/m$^2$/day), no greater than 5 g/m$^2$/day, no greater than 3 g/m$^2$/day, or even no greater than 2.5 g/m$^2$/day at 37.8° C. and 90% humidity as tested according to the MVTR Test Method.

Silane Polyurethane Polymer

The silane polyurethane polymer is liquid at room temperature (i.e., from 22° C. to 25° C.) and preferably exhibits a viscosity of no greater than 60,000 cP, no greater than 40,000 cP, from 10,000 cP to 60,000 cP, or even from 20,000 cP to 50,000 cP at 25° C. The silane polyurethane polymer is free of isocyanate groups and includes pendant silyl groups that are positioned laterally, terminally, or a combination thereof, to the polymer backbone. The silyl groups include at least one alkoxy group. The silane polyurethane polymer can be derived from a variety of components including, e.g., organofunctional silane, polyol, isocyanate, and various combinations thereof. Multiple different silane polyurethanes can be present in the sealant composition and can be differ from one another in at least one property including, e.g., molecular weight, viscosity, number of functional groups, type of functional groups, location of functional groups, composition, and combinations thereof.

Useful commercially available silane polyurethane polymers include, e.g., silane functional polyurethanes derived from polyether polyols available under the POLYMER ST series of trade designations including, e.g., POLYMER ST 80 trimethoxy silane modified polyurethane polymer having a backbone derived from polypropylene glycol and polyurethane and a viscosity of 20,000 at 25° C., POLYMER ST 81 trimethoxy silane modified polyurethane polymer having a backbone derived from polypropylene glycol and polyurethane and a viscosity of 40,000 at 25° C., and POLYMER ST 61 trimethoxy silane modified polyurethane polymer having a backbone derived from polypropylene glycol and polyurethane and a viscosity of 35,000 at 25° C., all of which are available from Evonik Industries AG (Germany) and the properties are as reported by the manufacturer.

The sealant composition includes no greater than 20% by weight, no greater than 15% by weight, at least 5% by weight, at least 7% by weight, or even from 5% by weight to 15% by weight silane polyurethane polymer.

Rosin-Based Tackifying Agent

Useful rosin-based tackifying agents have an acid number no greater than 15 and include, e.g., rosin ester tackifying agents (e.g., tall oil rosins (e.g., pentaerythritol ester of tall oil rosin), glycerol and pentaerythritol esters of natural and modified rosins (e.g., glycerol esters of pale, wood rosin, glycerol esters of gum rosin, glycerol esters of hydrogenated rosin, glycerol esters of polymerized rosin, glycerol esters of dimerized rosin, pentaerythritol esters of hydrogenated rosin, and phenolic-modified pentaerythritol esters of rosin), and combinations thereof), rosin acid tackifying agents (e.g., natural and modified rosins such as gum rosin, wood rosin, tall oil rosin, distilled rosin, hydrogenated rosin, dimerized rosin, and combinations thereof), polymerized rosins, and combinations thereof.

The rosin-based tackifying agent preferably exhibits a softening point of at least 100° C., at least 110° C., or even at least 120° C.

Suitable commercially available rosin ester tackifying agents are available under a variety of trade designations including, e.g., under the SYLVALITE series of trade designations from Kraton Corporation (Jacksonville, Fla.) including SYLVALITE RE 100L, SYLVALITE RE 110L, and SYLVALITE RE 115L pentaerythritol esters of tall oil rosin, under the WESTREZ series of trade designations from Ingevity (North Charleston, S.C.) including, e.g., WESTREZ 5110, WESTREZ 5101 and WESTREZ 5100 pentaerythritol esters of tall oil rosin, and under the NOVARES series of trade designations from Ingevity including, e.g., NOVARES 110 rosin ester.

The sealant composition includes at least 1% by weight, at least 5% by weight, at least 10% by weight, no greater than 40% by weight, no greater than 30% by weight, from 5% by weight to 40% by weight, from 10% by weight to 40% by weight, from 10% by weight to 35% by weight, or even from 15% by weight to 30% by weight rosin-based tackifying agent.

Ethylene Vinyl Acetate Copolymer

The ethylene vinyl acetate copolymer includes less than 40% by weight or even less than 25% by weight vinyl acetate. The ethylene vinyl acetate copolymer optionally includes at least two different ethylene vinyl acetate copolymers.

The first ethylene vinyl acetate copolymer exhibits a melt flow rate of at least 50 g/10 min, or even at least 800 g/10 min at 190° C. when tested according to ASTM D1238. Suitable first ethylene vinyl acetate copolymers are commercially available under a variety of trade designations including, e.g., under the ATEVA series of trade designations from Celanese Corporation (Irving, Tex.) including ATEVA 4030AC ethylene vinyl acetate including 40% vinyl acetate and having a melt index of 55 g/10 min, the ELVAX series of trade designations from Dow/DuPont (Wilmington, Del.) including ELVAX 40W ethylene vinyl acetate including 40% vinyl acetate and having a melt flow rate of 52 g/10 min at 190° C. (ASTM D1238).

The first ethylene vinyl acetate copolymer is present in the sealant composition in an amount of from 5% by weight to 30% by weight, from 10% by weight to 30% by weight, or even from 15% by weight to 25% by weight.

Useful optional second ethylene vinyl acetate copolymers exhibit a melt flow rate of at least 1000 g/10 min, at least 2000 g/10 min, or even at least 2500 g/10 min at 190 C. Suitable second ethylene vinyl acetate copolymers are commercially available under a variety of trade designations including, e.g., under the PA series of trade designations from Repsol S.A. (Madrid, Spain) including ALCUDIA PA-407 ethylene vinyl acetate including 15%; vinyl acetate and having a viscosity of 5000 centipoise (cP) min at 190° C. as reported by the manufacturer.

The second optional ethylene vinyl acetate copolymer is present in the sealant composition in an amount of from 0% by weight to 15% by weight, from 1% by weight to 15% by weight, or even from 1% by weight to 10% by weight.

The total amount of ethylene vinyl acetate in the sealant composition preferably is from 5% by weight to 30% by weight, from 10% by weight to 30% by weight, or even from 15% by weight to 25% by weight.

Butene Component

The butene component is polybutene, polyisobutene, polyisobutylene, or a combination thereof. The butene component has a weight average molecular weight (Mw) of at least 30,000 g/mol, at least 60,000 g/mol, less than 700,000 g/mol, less than 400,000 g/mol, or even less than 100,000 g/mol.

Useful polybutenes, polyisobutenes, and polyisobutylenes are commercially available under a variety of trade designations including, e.g., under the OPPANOL series of trade designations from BASF Corporation (Florham, N.J.) including, e.g., OPPANOL B 12 SFN polyisobutene having a Mw of 70,000 and OPPANOL B 15 SFN polyisobutene having a Mw of 108,000, and the TETRAX series of trade designations from JXTG Nippon Oil and Energy Corp., (Tokyo, Japan) including TETRAX 5T polyisobutylene having a Mw of 69,000 g/mol.

The sealant composition includes no greater than 10% by weight, no greater than 7% by weight, from 1 by weight to 10% by weight, from 1% by weight to 7% by weight, or even from 1% by weight to 5% by weight of a butene component.

Filler

Useful fillers include, e.g., talc, fumed silica, precipitated silica, aluminum silicates, nanopowders, carbon black, calcium carbonate, and combinations thereof. Suitable fillers are commercially available under a variety of trade designations including, e.g., under the MISTRON series of trade designations from Imerys Talc America (Three Forks, Mont.) including MISTRON VAPOR R microcrystalline talc.

The sealant composition preferably includes less than 40% by weight, less than 30% by weight, from 0.1% by weight to 30% by weight, or even from 10% by weight to 30% by weight filler.

Second Tackifying Agent

The second tackifying agent is different from the first rosin-based tackifying agent. Examples of suitable second tackifying agents include aliphatic, cycloaliphatic, aromatic, aliphatic-aromatic, aromatic modified alicyclic, and alicyclic hydrocarbon resins and modified versions and hydrogenated derivatives thereof; alpha methyl styrene resins and hydrogenated derivatives thereof; and combinations thereof.

The second tackifying agent preferably includes less than 15% by weight, or even less than 10% by weight aromaticity based on the weight of the second tackifying agent and as reported by the manufacturer.

The second tackifying agent preferably has a ring and ball softening point of at least 100° C., from 100° C., to 150° C., or even from 110° C., to 140° C.

Suitable commercially available second tackifying agents include, e.g., partially hydrogenated aromatic modified aliphatic petroleum hydrocarbon resins available under the ESCOREZ series of trade designations from ExxonMobil Chemical Co. (Houston, Tex.), including, e.g., ESCOREZ 5600, ESCOREZ 5615, and ESCOREZ 5637; aliphatic-aromatic petroleum hydrocarbon resins available under the WINGTACK EXTRA trade designation from Goodyear Chemical Co, (Akron, Ohio); aromatic hydrogenated hydrocarbon resins available under the REGALREZ 1094 trade designation from Hercules (Kingsport, Tenn.).

The sealant composition includes at least 0.1% by weight, less than 25% by weight, less than 20% by weight, from 0.1% by weight to 25% by weight, from 1% by weight to 20% by weight, or even from 1% by weight to 17% by weight second tackifying agent.

ADDITIONAL COMPONENTS

The sealant composition optionally includes other additives including, e.g., antioxidants, catalysts, adhesion promoters, plasticizers (e.g., non-phthlate plasticizers), thermal stabilizers, optical brighteners, rheology modifiers, corrosion inhibitors, dehydrators, flame retardants, pigments, and combinations thereof.

Useful antioxidants include, e.g., antioxidants available under the TINUVIN series of trade designations including, e.g., TINUVIN 770 and TINUVIN 328 and under the IRGANOX series of trade designations including e.g., IRGANOX 1010 all of which are available from BASF Corporation (Florham, N.J.). The antioxidant can be present in the composition in an amount of from 0% by weight to 3% by weight, from 0.1% by weight to 2% by weight, or even from 0.2% by weight to 1% by weight.

Catalyst can be added to the composition to increase the rate of crosslinking. Useful catalysts include, e.g., organotin compounds including, e.g., dialkyl tin dicarboxylates (e.g., dibutyl tin dilaurate and dibutyl tin diacetate), tin carboxylates, stannous salts of carboxylic acids (e.g., stannous octoate and stannous acetate), tetrabutyl dioleatodistannoxane, colorless organic titantates, organosilicon titantates, alkyltitantates, and metal alkoxides (e.g., aluminum isopropoxide and zirconium isopropoxide), and combinations thereof. The catalyst can be present in the composition in an amount of from 0% by weight to 5% by weight, 0.001% by weight to 5% by weight from 0.005% by weight to 1% by weight, or even from 0.01% by weight to 0.5% by weight.

The composition optionally includes a silane-containing coupling agent, which is also referred to as a "silane adhesion promoter." One example of a suitable silane-containing coupling agent is 3-glycidyloxypropyl trialkoxysilane. The silane-containing coupling agent can be present in the composition in an amount of from 0% by weight to 5% by weight, from 0.2% by weight to 2% by weight, or even from 0.4% by weight to 1% by weight.

USE

The sealant composition can be used to bond a variety of substrates to one another including, e.g., glass, metal (e.g., aluminum and stainless steel), fiberglass composites, vinyl, polyvinyl chloride, polymer (e.g., polypropylene), wood (e.g., pressed wood composites, which optionally include polymer), and combinations thereof. The composition is particularly useful for bonding glass to various substrates including, e.g., other glass substrates, polymer substrates (e.g., acrylic substrates), metallic substrates, wood substrates (e.g., wood composites), spacers (e.g., thermoplastic spacers), and combinations thereof. The composition can be used in a variety of constructions including, e.g., insulating glass units, sash frame assemblies, automotive and molding applications, windows, doors, walls, and constructions that require good adhesion to glass, metal, plastic and combinations thereof.

The sealant composition can be applied using a wide variety of application techniques including, e.g., linear extruder, hand gun, other forms of extruder beads, and combinations thereof. The substrates are subsequently joined to one another within the open time of the applied composition, the duration of Which depends on the composition of the applied mixture.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Tensile Strength at Break and Elongation at Break Test Method

The tensile strength at break and elongation at break of a sealant composition are determined according to ASTM-D638-00 entitled, "Standard Test Method for Tensile Properties of Plastics." A homogeneous film of the sealant composition is pressed at 100° C. to a thickness of from 60 mil to 80 mil. Type IV dogbone specimens are cut from the film and conditioned at 23° C. and 50% relative humidity. The specimens are then tested for tensile strength at break and % elongation at break after 24 hours and 30 days. The tensile strength at break values at 24 hours and 30 days are reported in pounds per square inch (psi) and the elongation at break values at 24 hours and 30 days are reported in %.

Lap Shear Strength Test Method

Lap shear strength is determined according to ASTM C-961-01 entitled, "Standard Test Method for Lap Shear Strength of Hot Applied Sealants," with the exception that the test specimen is prepared as follows. A homogeneous film of the sealant composition is pressed at 100° C. to a thickness of 60 mil between two pieces of release paper. After the film has cooled, 1 in by 1 in samples are cut from the film. Aluminum strips, 1 in by 4 in, are wiped with toluene and allowed to The release paper on one side of the sample of sealant film is removed and then the sample of sealant is placed on one end of a cleaned aluminum strip. The release paper on the second side of the sample of sealant film is then removed and two paperclip shims are placed in the center of sealant, parallel to the 1 in width of the aluminum strip. A second aluminum strip is placed on top of the sealant and paper clip shims such that the aluminum strips overlap by 1 in covering the 1 in square of the sealant film to produce the test specimen.

The test specimens are then heated in an oven at a temperature and for a duration sufficient to enable the film to melt. Useful temperatures and times have been found to be 120° C. for from 5 to 10 minutes.

The specimens are then removed from the oven and the aluminum substrate is immediately pressed into the sealant using a tongue depressor until the metal strips touch the shims. The test specimens are then conditioned at 23° C. and 50% humidity.

The test specimens are then tested in the shear mode on an Instron tester with a crosshead speed of 1 in per minute. The average shear strength is recorded in psi (MPa).

The lap shear strength at 24 hours is measured 24 hours after preparing the lap shear bond test specimens.

The lap shear strength at 30 days is measured after conditioning the lap shear bond test specimens at 23° C. and 50% humidity in a controlled environment for 30 days.

Shear Adhesion Failure Temperature (SAFT) Test Method

Shear Adhesion Failure Temperature is determined according to the following method. Samples are prepared according to the Lap Shear Test Method and then conditioned for 30 days and 44 days at 23° C. and 50% relative humidity.

The test specimens are suspended in a forced air oven programmed to increase at a rate of 25° C. per hour from room temperature to 175° C., by firmly affixing one end of the specimen to a support in the oven capable of suspending a 1 in wide test specimen in shear mode. A 1 pound (453.6 gram) weight is suspended from the bottom end of the test specimen and allowed to hang freely. The oven program is started. The temperature at which the sample delaminates is recorded to the nearest degree Celsius (C).

The average temperature of at least three samples is reported to the nearest degree C., as the shear adhesion failure temperature (SAFT)). The samples are tested at 30 days and 44 days after sample preparation.

Viscosity Test Method

Viscosity of a sealant composition is measured immediately after the sealant composition is prepared using a Brookfield Thermoset Viscometer using an S-29 spindle at 10 rotations per minute at a sample temperature of 135° C.

Permeability Coefficient (MVTR) Test Method

The permeability coefficient (MVTR) is determined according to ASTM F1249-90 entitled, "Standard Test Method for Water Vapor Transmission Rate Though Plastic Film and Sheeting using a Modulated Infrared Sensor." The test is conducted at approximately 37° C. and 90% relative humidity on a sample in the form of a film having a thickness of from 60 mils to 80 mils.

60° C. Heated Dead Load Test Method

Heated dead load at 60° C. is determined according to the following method. Samples are prepared according to the Lap Shear Test Method and then conditioned for 30 days and 44 days at 23° C. and 50% relative humidity. A one pound weight is suspended from the lap shear bond of the sample while the sample is exposed to 60° C. The static load resistance (i.e., dead load) of lap-shear bonds is measured. When the one pound weight falls from the sample, the time to failure is recorded in units of minutes.

Molecular Weight Determination by THF System

Molecular weight is determined according to the following method. Approximately 0.05 g of sample is dissolved in 10 milliliters (mL) tetrahydrofuran (THF) and mixed on a shaker overnight. The sample is then filtered through a 0.45 μm polytetrafluoroether (PTFE) filter prior to yield a clear, colorless solution. The resultant solution is analyzed by size exclusion chromatography (SEC) at 40° C. using THF as the eluent, three AGILENT Mixed-B columns, and a refractive index (RI) detector. The retention volumes are calibrated to EASICAL 10 point polystyrene standards having molecular weights ranging from 580 grams per mole (g/mol) to 6,870,000 g/mol. The Mark-Houwink parameters for all samples are K=15.2 and alpha=0.75. No correction for polymer conformation is made.

Controls C1 and C2 and Examples E1-E5

The compositions of Controls C1 and C2 and Examples E1-E5 were prepared by adding the tackifiers, ethylene vinyl acetate copolymers, and butene component in the amounts set forth in Table 1 below to a mixer set to a temperature of 149° C. and allowing the components to melt. Once melted the mixer was turned on and the composition was mixed for about 15 minutes. The mixer was stopped, talc was added in the amount set forth in Table 1 below, and then mixing was resumed under vacuum for one hour. POLYMER ST 80 was then added to the mixture in the amounts set forth in Table 1 below and the composition was mixed under vacuum for one hour. The viscosity of the resulting compositions was then determined and the results are set forth in Table 1.

TABLE 1

|  | C1 | C2 | E1 | E2 | E3 | E4 | E5 |
|---|---|---|---|---|---|---|---|
| IHSCOREZ, 5637[1] | 15 | 17 | 15 | 15 | 15 | 15 | 15 |
| ATEVA 4030AC[2] | 20 | 20 | 20 | 20 | 20 | 20 | 20 |
| PA-407[3] | — | 6 | — | 5 | 3 | 0 | 3 |
| Grey EVA 4 | 2 | 2 | 2 | 2 | 2 | 2 | 2 |
| OPPANOL B12[5] | 0 | 0 | 0 | 0 | 0 | 0 | 5 |
| INDOPOL H-1900[6] | 5 | 0 | 0 | 0 | 0 | 0 | 0 |
| OPPANOL B 50 SF[7] | 0 | 0 | 5 | 0 | 0 | 0 | 0 |
| OPPANOL B 15[8] | 0 | 0 | 0 | — | — | — | 0 |
| Sylvalite RE 110L[9] | 18 | 20 | 18 | 18 | 20 | 20 | 20 |
| Microcrystalline talc | 25 | 25 | 25 | 25 | 25 | 28 | 25 |
| POLYMER ST 80[10] | 10 | 10 | 10 | 10 | 10 | 10 | 10 |
| Total | 100 | 100 | 100 | 100 | 100 | 100 | 100 |
| Viscosity at 135° C. (cP) | 132,000 | 138,000 | 414,000 | 214,000 | 200,000 | 196,000 | 220,000 |

1= ESCOREZ 5637 cycloaliphatic hydrocarbon resin having a softening point of 129.5° C. and 5.2% aromaticity (ExxonMobil Chemical Co., Houston, Texas),
2= ATEVA 4030AC EVA including 40%; by weight vinyl acetate and exhibiting a Melt Index of 55 g/10 min ASTM D1238 (190° C., 2.16 kg) (Celanese Corporation, Irving, Texas)
3= ALCUDIA PA-407 EVA including 15% by weight vinyl acetate and exhibiting a Brookfield viscosity of 5,000 cP at 190° C. and a density of 0.937 g/cm³ (Repsol S.A., Madrid, Spain)
4= Grey ethylene vinyl acetate
5= OPPANOL B 12 SFN polyisobutene having a Mw of 70,000 g/mol (BASF Corporation, Florham, New Jersey)
6= INDOPOL H-1900 polybutene having a Mw of 4500 g/mol
7= OPPANOL N 50 SF polyisobutene having a Mw of 565,000 g/mol (BASF Corporation, Florham, New Jersey)
8= OPPANOL B 15 SFN polyisobutene having a Mw of 108,000 g/mol (BASF Corporation, Florham, New Jersey)
9= SYLVALTTE RE 110L pentaerythritol ester of tall oil rosin having a softening point of 107° C.
10= POLYMER ST 80 silane functional polyurethane exhibiting a viscosity of 20,000 at 190° C. (Evonik Industries AG, Germany)

The sealant compositions of Examples C1 and C2 and E1-E5 were then tested according to the SIFT, 60° C. Heated Dead Load, Tensile Strength at Break, % Elongation at Break, and Lap Shear test methods, and the results are set forth in Table 2.

TABLE 2

|  | C1 | C2 | E1 | E2 | E3 | E4 | E5 |
|---|---|---|---|---|---|---|---|
| SAFT ° C. at 30 days | 57.2 | 58.3 | 71.1 | 63.9 | 66.1 | 63.9 | 75 |
| 60° C. Heated Dead load after 30 days (mins) | 7.5 | 8.5 | 97 | 30 | 44 | 30 | 105 |
| 60° C. Heated Dead load after 44 days (mins) | NT[11] | NT | 106 | 71 | 67 | 58 | 282 |
| Elongation at Break (%) |  |  |  |  |  |  |  |
| 24 hours | NT | NT | NT | 968.5 | 1076.5 | 1084.7 | 1077.1 |
| 30 days | NT | NT | NT | 679.4 | 625.9 | 594 | 616.1 |
| Tensile Strength at Break (psi) |  |  |  |  |  |  |  |
| 24 hours | NT | NT | NT | 222.6 | 244.3 | 268.8 | 259.9 |
| 30 days | NT | NT | NT | 351 | 363.4 | 414.1 | 399.6 |
| Lap Shear (psi) |  |  |  |  |  |  |  |
| 24 hours | NT | NT | 139.4 | 134.6 | 131.9 | 140.3 | 133.8 |
| 30 day | NT | NT | 163.1 | 174.8 | 172.5 | 193.8 | 183.4 |

11= Not Tested

All documents referred to herein are hereby incorporated to the extent they do not conflict.

Other embodiments are within the claims.

What is claimed is:

1. A moisture curable hot melt sealant composition comprising:
   a silane polyurethane polymer that is free of isocyanate groups and derived from polyether;
   a first rosin-based tackifying agent;
   a second tackifying agent different from the first rosin-based tackifying agent;
   a first ethylene vinyl acetate copolymer;
   a butene component having a weight average molecular weight from 30,000 g/mole to 700,000 g/mole, the butene component being selected from the group consisting of polyisobutylene, polyisobutene, polybutene, and combinations thereof; and
   filler.

2. The sealant composition of claim 1, wherein the second tackifying agent is selected from the group consisting of aliphatic tackifying agent, aromatic tackifying agent, aromatic-modified aliphatic tackifying agent, cycloaliphatic tackifying agent, aromatic-modified cycloaliphatic tackifying agent, and combinations thereof.

3. The sealant composition of claim 2, wherein the second tackifying agent comprises from 0% by weight to no greater than 15% by weight aromaticity based on the weight of the second tackifying agent.

4. The sealant composition of claim 3, wherein the second tackifying agent exhibits a softening point of at least 100° C.

5. The sealant composition of claim 1 comprising from 10% by weight to 40% by weight of the first rosin-based tackifying agent.

6. The sealant composition of claim 1, wherein the butene component has a weight average molecular weight from 30,000 g/mol to less than 400,000 g/mol.

7. The sealant composition of claim 1, wherein the first rosin-based tackifying agent is a rosin-ester tackifying agent.

8. The sealant composition of claim 1 comprising
   no greater than 20% by weight of the silane polyurethane polymer,
   from 5% by weight to 30% by weight ethylene vinyl acetate, and
   from 10% by weight to 40% by weight of the first rosin-based tackifying agent.

9. The sealant composition of claim 8 comprising no greater than 10% by weight of the butene component.

10. The sealant composition of claim 1 comprising
    no greater than 20% by weight of the silane polyurethane polymer,
    from 5% by weight to 30% by weight ethylene vinyl acetate,
    from 5% by weight to 30% by weight of the first rosin-based tackifying agent, and
    from 5% by weight to 20% by weight of the second tackifying agent.

11. The sealant composition of claim 10 comprising no greater than 10% by weight of the butene component.

12. The sealant composition of claim 1, comprising from 5% by weight to 20% by weight of the second tackifying agent.

13. The sealant composition of claim 1, wherein the silane polyurethane polymer has a viscosity of from 10,000 cP to 60,000 cP at 25° C.

14. The sealant composition of claim 1 comprising from 1% by weight to no greater than 7% by weight of the butene component.

15. The sealant composition of claim 1, wherein the sealant composition exhibits an elongation at break of at least 500% at 30 days.

16. The sealant composition of claim 1, wherein the sealant composition exhibits a shear adhesion failure temperature of at least 60° C.

17. The sealant composition of claim 1, wherein the sealant composition exhibits a lap shear of at least 150 psi at 30 days.

18. The sealant composition of claim 1, wherein the sealant composition exhibits a moisture vapor transmission rate of no greater than 25 grams per square meter per day ($g/m^2$/day).

19. The sealant composition of claim 1, wherein the sealant composition exhibits a tensile strength at break of at least 200 psi at 24 hours.

20. The sealant composition of claim 1, wherein the sealant composition exhibits a 60° C. heated dead load of at least 90 minutes when tested at 44 days.

21. The sealant composition of claim 10, wherein the silane polyurethane polymer has a viscosity of from 10,000 cP to 60,000 cP at 25° C.

22. The sealant composition of claim 1, wherein the filler comprises talc.

23. An insulating glass unit comprising:
    a first pane of glass;
    a second pane of glass;
    a spacer disposed between the first pane of glass and the second pane of glass; and
    the sealant composition of claim 1 in contact with the first pane of glass, the second pane of glass, and the spacer.

* * * * *